April 19, 1966  A. DE BOER  3,246,801
WATER ACTIVATED AUTOMATIC INFLATION DEVICE
Filed Oct. 2, 1963
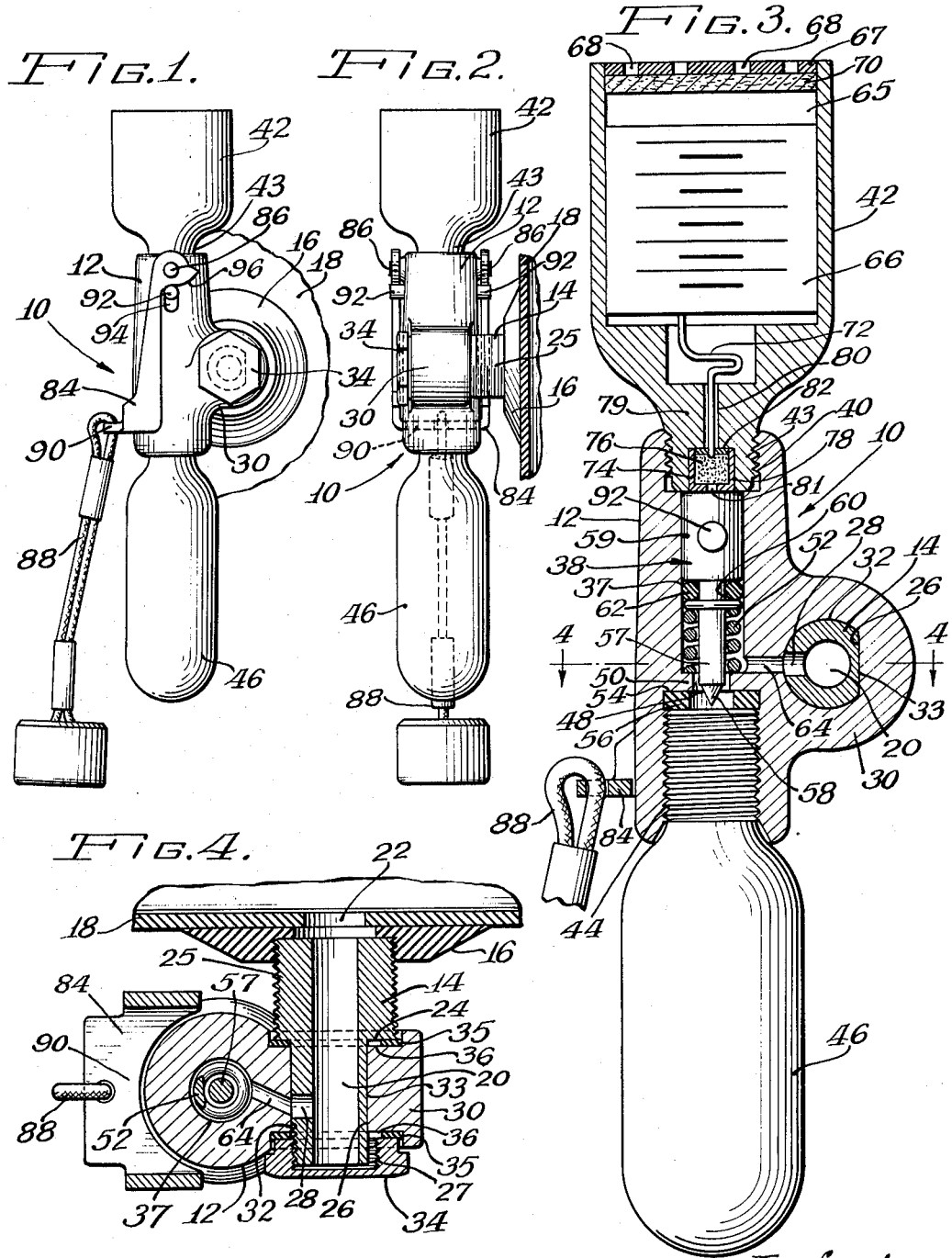
Inventor:
Albert DeBoer
By Bair, Freeman
& Molinare  Attys.

United States Patent Office 3,246,801
Patented Apr. 19, 1966

3,246,801
WATER ACTIVATED AUTOMATIC INFLATION DEVICE
Albert de Boer, St. Louis, Mo., assignor to Knapp-Monarch Company, a corporation of Delaware
Filed Oct. 2, 1963, Ser. No. 313,204
6 Claims. (Cl. 222—5)

This invention relates to water-activated inflation devices for automatically releasing gas into inflatable life-preserving equipment, such as life rafts and life jackets, the inflation devices also being provided with means for manual operation thereof.

Inflatable life-saving equipment, such as inflatable life rafts and jackets, which may be inflated by the discharge of a pressurized gas, such as $CO_2$, thereinto, is, of course, well known. Known inflation devices include an attachment which is connected to the body to be inflated, and such attachments are commonly provided with a cylinder or bulb of compressed gas; the attachment is also ordinarily provided with means for piercing the compressed gas cylinder to thereby effect a release of gas through the attachment and into the inflatable body.

Known inflation devices are for the most part manually activatable. In addition, some inflation devices are activated following contact with water in order to provide added safety in the event, for example, that the person utilizing the inflatable equipment is dazed or unconscious at the time of contacting the water. All of such known water-activated inflation devices require the use of water-soluble material, as tablets or powders which, upon dissolving in water, release a spring means which ultimately causes the piercing of a pressurized gas cylinder or bulb, to thereby release gas to the inflatable life-saving equipment. However, these known water-activated devices have certain inherent disadvantages. Thus, the tablet of material may disintegrate inadvertently due to absorption of moisture from the air or merely because of aging while under spring pressure. Also, the inflation of equipment is dependent upon the length of time required for solubilizing the powder or tablets before the piercing means can be released for piercing the gas cylinder. Thus, if an unduly long period of time elapses before the tablet of powder is solubilized the safety of the person depending upon the life-saving equipment would be dangerously imperiled. A further disadvantage of the known water-activated inflation devices is that, following the dissolving of the powder or tablets, a compressed spring is ordinarily required for driving a pin against the pierceable gas cylinder in order to release gas therefrom; in order to be sure that sufficient force is imparted to the piercing pin for piercing the gas cylinder, relatively heavy springs must be utilized. When such springs are used, assembly problems and costs are increased, thereby not only undesirably increasing the cost of the devices, but also complicating the construction of the devices.

It is therefore an important object of this invention to provide water-activated, automatic inflation devices for inflating life-saving equipment, wherein such devices substantially avoid the disadvantages of known prior art devices.

It is also an object of this invention to provide an improved water-activated inflation device for releasing gas to inflatable life-saving equipment, wherein an extremely fast activation of the inflation device takes place following contact with water, to thereby assure the inflating of such equipment in a very short period of time, thus providing an important safety feature for inflation devices.

It is a further object of this invention to provide an automatic, water-activated inflation device for releasing gas to inflatable life-preserving equipment, wherein a gas cylinder piercing means is activated by an explosive force, which in turn is activated by electrical generator means.

It is another object of this invention to provide a water-activated inflation device for inflatable life-saving equipment, wherein the device is activated by combination explosive means-electrical generator means that are characterized by simplicity and economy of construction and of manufacture, and by efficiency of operation.

Further purposes and objects of this invention will appear as the specification proceeds.

A particular embodiment of the present invention is illustrated in the accompanying drawings wherein:

FIGURE 1 is a front elevational view of an inflation device;

FIGURE 2 is a side elevational view of the embodiment of FIGURE 1;

FIGURE 3 is an enlarged, partially sectioned longitudinal view through the embodiment of FIGURE 1; and FIGURE 4 is sectional view taken along the line 4—4 of FIGURE 3.

Referring to the drawings, my inflation device 10 includes a valve body 12 which is connected to a tubular stud 14, which is threadably secured at one end to attachment means, shown as an annular flange 16, constructed of rubber or rubberized fabric or the like; the flange 16 provides means for attaching the device 10 to the wall 18 of the inflatable appliance or equipment. The tubular stud 14 is also provided with a central bore 20 which communicates with the interior of the life-saving equipment through an opening 22 in the wall 18.

The stud 14 has an annular shoulder 24, intermediate the ends of the stud and adjacent the threaded portion 25; the portion of the stud 14 located between the shoulder 22 and the outer end of the stud 14 is in a non-circular form, having a flat 26, as shown best in FIGURE 3. The stud 14 is threaded at its outer end 27, and the wall of the stud 14 between the shoulder 24 and the threaded end 27 includes a transverse aperture 28.

The valve body 12 is desirably constructed of a light weight metal, as aluminum, and includes a sidewardly projecting boss 30 which has an opening 32, transverse to the longitudinal axis of the valve body 12, which is adapted to receive the stud 14. The non-circular opening 32 corresponds generally in cross-section to the non-threaded portion of the stud 14 and includes a flat 33 which cooperates with the flat 26 provided on the tubular stud 14 to prevent rotation between the stud 14 and the valve body 12. The valve or actuator body 12 is held in place by the cap member 34 which is threaded on to the outer threads 27 of the stud 14. A pair of gaskets 35 are located in the annular recesses 36 provided at each end of the opening 32; upon tightening of the cap 34 on the stud 14, one gasket 35 is squeezed within a recess 36 by the shoulder 24 of the stud 14 and the other gasket is squeezed within the other recess 36 by the annular base of the cap 34, thus providing a pressure-tight seal between the stud 14 and the valve body 12.

The valve body 12 is provided with a central bore 37 which is adapted to slidably receive a pin member 38. The upper end of the central bore 37 communicates with an internally threaded portion or socket 40 of increased diameter, which is adapted to threadably receive a container 42. The lower end of the bore 37 communicates with an internally threaded socket 44, also of increased diameter which is adapted to threadably receive a gas cylinder or cartridge 46, containing a pressurizedd gas, such as $CO_2$, the sockets 40 and 44 being in axial alignment. There is a restricted portion 48 at the lower end of the bore 37 which defines an annular shoulder 50, to thus provide a seat for the lower end of the spring 52. A recess 54, located between the shoulder 50 and the socket 44, is adapted to receive a gasket 56 for preventing the escape of gas at the threaded connection between the valve body 12 and the gas cylinder 46.

The piercing pin 38 is slidably positioned within the bore 37 and includes a shank 57 having pointed lower end 58 which, upon depression, is adapted to pierce the upper end of the pressurized gas cylinder 46, thereby permitting the release of gas therefrom. The head or upper portion 59 of the pin 38 is adapted to slidably move within the central bore 37 and includes a peripheral groove 60 which receives an O-ring 62; the O-ring 62 prevents the escape of gas through the upper end of the central bore 37. The pin 38 is normally biased upwardly by the spring 52 so that the point 58 thereof is located above, but in close proximity to the pierceable upper end of the cylinder 46. Following the downward piercing movement of the pin 38 releasing gas from the cylinder 46, gas passes through the constricted opening 48 of the bore 37 and then outwardly through the transverse conduit 64 in the wall of the valve body 12 and into the central bore 20 of the tubular stud 14, whereby gas enters the inflatable appliance.

In order to drive the piercing pin 38 downwardly for effecting the release of gas from the cylinder 46, I provide a novel, combination water activated electrical generator-explosive medium. The container 42 made of metal or other suitable material, includes a threaded shank 43, which is threadably received by the threaded socket 40 of the body 12; the container is provided with a chamber 65 which is adapted to receive a battery 66. The battery 66 is of known construction and may be of the type manufactured by Eureka Williams, Model MK 72-Mod 1. The outer end of the battery chamber 65 is enclosed by a plate 67, having a plurality of openings 68 for allowing the passage of water into the battery 66. A filter medium 70 is positioned within the chamber 65 and adjacent the openings 68 for substantially preventing the passage of impurities, while allowing the passage of water therethrough for activating the battery 66.

Following activation of the battery 66 by water, electrical current heats the resistance wire 72 which terminates within the explosive squib 74. The explosive squib 74, containing an explosive medium 76, is positioned in a second chamber or well 78 provided in the shank 43 of the container 42. A relatively thick wall 79 separates the first and second chambers 65 and 78; a channel 80 is provided in the wall 79 for allowing the passage of the wire 72 from the battery 66 to the squib 74. An opening 81 is provided in the squib for allowing communication between the explosive medium 76 and the top of the head 59 of the pin 38. From the standpoint of safety, it is highly desirable that the opening 81 opens directly to the top of the head 59 in order that the full impact force of explosion will be directed against the pin 38; if a space were interposed between the squib 74 and the head 59, the explosive force would be somewhat dissipated, possibly resulting in a failure to impart sufficient force to the pin 38 for piercing the cartridge 46. Thus, upon heating of the resistance wire 72, the explosive medium 76 is ignited, providing an explosive force for driving the pin 38 downwardly and against the upwardly biasing action of the spring 52, to thereby force the point 58 of the pin 38 into the pierceable upper end of the gas cylinder 46, releasing gas therefrom. The spring 52, following dissipation of the explosive force, drives the pin upwardly to thereby allow unrestricted discharge of gas from the cartridge 46. It is desirable that a back-up plate 82 be provided in the squib 74, at the end opposite from the opening 80, whereby the explosive force is directed downwardly, and not upwardly into the battery 66 which could dissipate the force of the explosion; dissipation of the explosive force would be dangerous since the force could be insufficient to drive the pin through the pierceable upper end of the cylinder 46.

Thus, a highly effective means for driving a pin for releasing gas from a gas cylinder is provided; a high impact force is imparted to the piercing pin 38 in order to assure that sufficient force is provided for piercing the cylinder 42, while at the same time extremely fast inflation of the life-saving equipment takes place upon activation of the battery 66 with water.

As an added safety measure, in the event that the automatic, water-activated electrical generator-explosive medium fails to function, the piercing pin may be alternately operated by manual control. For this purpose, a U-shaped lever 84 is pivoted upon the laterally extending pins 86 located on the upper wall of the valve body 12. A handle 88 is secured to the bight 90 of the lever 84, provided for operation thereof. A pair of outwardly-projecting studs 92, provided on the upper end of the piercing pin 38, extend through the elongated openings or slots 94 provided in opposite sides of the wall of the body 12. The studs 92 abut the camming portion 96 of the lever 84, whereby upon pivoting of the lever 84, the camming portion 96 forces the piercing pin 38 downwardly upon contact with the studs 92, to thereby effect a manual piercing of the cartridge 46.

While in the foregoing there has been provided a detailed description of a particular embodiment of the present invention, it is to be understood that all equivalents obvious to those having skill in the art are to be included within the scope of the invention claimed.

What I claim and desire to secure by Letters Patent is:

1. In a device of the type for explosively actuating a pin to pierce a pressurized gas cylinder for automatically inflating a life-preserving appliance upon the device's contact with water, the improvement comprising a valve body with an elongated bore therein and with a socket of greater diameter than said bore arranged axially of and communicating with one end of the bore, a headed piercing pin with an abutment end thereon slidably-arranged in said bore with the head of the pin cooperating with the walls of the bore to prevent escape of gas therebetween, means normally biasing the head of the pin toward said socket, a container for a water-activated explosive separably secured to said valve body and providing a shank portion in said socket positioned to have the abutment end of the head abut thereagainst, the container defining a first chamber therein in which is positioned a water-actuatable electricity-producing element and a second chamber in said shank portion in which is positioned an explosive medium arranged to direct the force of its explosion directly against the head of the piercing pin.

2. A device as in claim 1 wherein the walls of the socket are threaded and the shank of the container is threaded to provide for ready connection and separation of the container with the valve body.

3. A device as in claim 1 wherein the container provides a relatively thick wall therein between the first and second chambers, so as to help direct the force of the explosive medium.

4. A device as in claim 1 wherein the first chamber in the container is at least partially closed off by an apertured plate which permits entry of water into said first chamber.

5. A device as in claim 4 including a filter in said first chamber between said apertured plate and the battery.

6. A device as in claim 1 wherein a portion of the head of the piercing pin spaced from the abutment end thereof has stud means extending laterally therefrom outwardly of the valve body, and a camming lever pivotally carried on said valve body and engaging the stud means to provide for selective manual actuation of the piercing pin.

References Cited by the Examiner
UNITED STATES PATENTS
3,059,814  9/1962  Poncel et al. _____ 222—5

RAPHAEL M. LUPO, *Primary Examiner.*
N. L. STACK, *Assistant Examiner.*